United States Patent [19]

Bodig et al.

[11] 4,275,703
[45] Jun. 30, 1981

[54] FLUX CONTROL SYSTEM FOR A HALL GENERATOR IN AN IGNITION SYSTEM OF AN INTERNAL COMBUSTION ENGINE

[75] Inventors: Bernd Bodig, Leinfelden; Herman Roozenbeek, Schwieberdingen; Werner Jundt, Ludwigsburg, all of Fed. Rep. of Germany

[73] Assignee: Robert Bosch GmbH, Stuttgart, Fed. Rep. of Germany

[21] Appl. No.: 69,622

[22] Filed: Aug. 24, 1979

[30] Foreign Application Priority Data

Sep. 29, 1978 [DE] Fed. Rep. of Germany ....... 2842386

[51] Int. Cl.³ .............................................. F02P 3/04
[52] U.S. Cl. .................................... 123/617; 123/414; 123/609; 123/618; 310/70 A; 310/DIG. 3
[58] Field of Search ............... 123/612, 617, 618, 609, 123/146.5 A, 414, 415, 418; 310/70 R, 70 A, DIG. 3; 330/6

[56] References Cited

U.S. PATENT DOCUMENTS

| | | | |
|---|---|---|---|
| 3,112,464 | 11/1963 | Ratajski et al. ................ | 310/DIG. 3 |
| 3,139,876 | 7/1964 | Jukes .................................... | 123/618 |
| 3,447,004 | 5/1969 | Falge ............................... | 310/70 R |
| 3,882,840 | 5/1975 | Adamian et al. .................... | 123/618 |
| 4,150,653 | 4/1979 | Grancoin ............................ | 123/617 |
| 4,165,726 | 8/1979 | Helmer, Jr. .......................... | 123/617 |
| 4,202,304 | 5/1980 | Jundt et al. .......................... | 123/618 |

FOREIGN PATENT DOCUMENTS 1216019 5/1966 Fed. Rep. of Germany ... 123/146.5 A
2549586 5/1977 Fed. Rep. of Germany .

*Primary Examiner*—Charles J. Myhre
*Assistant Examiner*—Andrew M. Dolinar
*Attorney, Agent, or Firm*—Frishauf, Holtz, Goodman & Woodward

[57] ABSTRACT

The AC signal generator furnishing the basic control signal for ignition timing is a Hall generator the flux through which is gradually increased while the crankshaft of the engine rotates through a predetermined angle of rotation. The Hall generator is part of a magnetic circuit which also includes an air gap. The change in flux is accomplished by rotating a tapered magnetically conductive member through the air gap. The output of the Hall generator is applied through a linear amplifier to a threshold circuit whose output controls an electronic interrupter switch connected in series with the ignition coil.

4 Claims, 3 Drawing Figures

FLUX CONTROL SYSTEM FOR A HALL GENERATOR IN AN IGNITION SYSTEM OF AN INTERNAL COMBUSTION ENGINE

The present invention relates to ignition timing systems for internal combustion engines. More particularly, it relates to systems wherein an AC control signal having a frequency corresponding to engine speed is used to trigger a threshold circuit whose output in turn controls the conduction and blocking of an electronic interrupter switch connected in series with the ignition coil.

BACKGROUND AND PRIOR ART

A system of the above-described type is disclosed in published German application DE-OS No. 25 49 586. In order to generate control signals of sufficient amplitude, the AC generator of this prior art system and its associated coil must be relatively large so that it is difficult to accommodate it in the distributor housing. Further, its construction is relatively expensive both because of the use of relatively expensive materials and the required precision. It is a further disadvantage of the known system that the peak value of the AC control signal increases with increasing engine speeds. Therefore, special precautions must be taken to assure adequate operation at low engine speeds.

THE INVENTION

It is an object of the present invention to overcome the above-stated difficulties with the prior art system.

In accordance with the present invention, the control signal generator is a Hall generator and a magnetic circuit is provided which is coupled to the Hall generator and which slowly changes the magnetic flux through the Hall generator while the crankshaft of the engine turns through a predetermined angle of rotation. The predetermined angle includes those time periods in which the electronic ignition switch in series with the ignition coil must be switched to the conductive state to allow accumulation of ignition energy and the time at which the switch must be switched to the blocked state, thereby initiating the spark. In a preferred embodiment, the Hall generator is part of a magnetic circuit which includes two yoke pieces defining an air gap, a permanent magnet and a further part of the yoke, the Hall generator being positioned between the further part of the yoke and one of the pieces defining the air gap. The flux variation is accomplished by rotating a tapered magnetically conductive member through the air gap while the crankshaft rotates through the above-mentioned predetermined angle of rotation.

DRAWINGS DESCRIBING A PREFERRED EMBODIMENT

Figure 1:
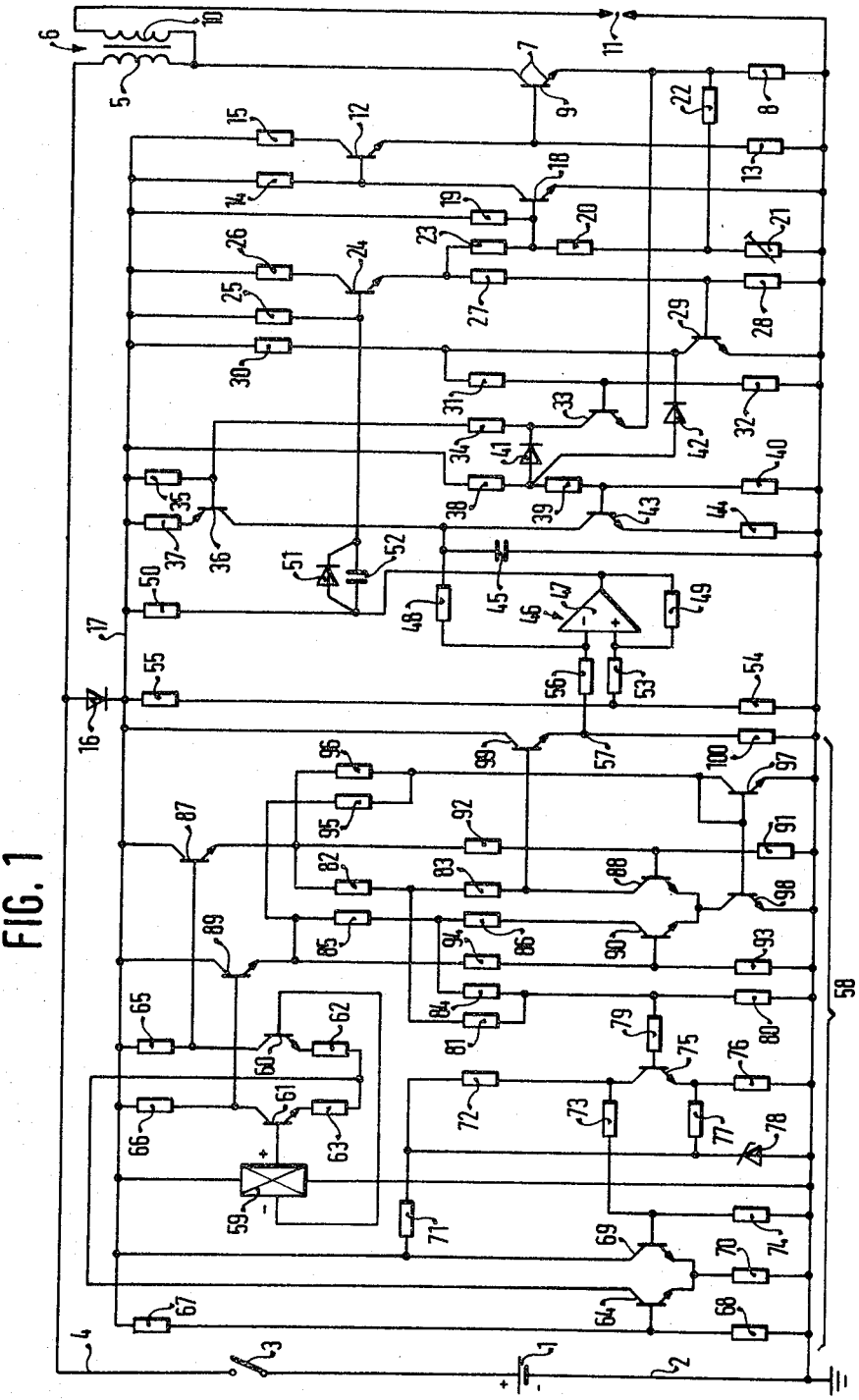
FIG. 1 is a circuit diagram of an ignition system according to the present invention.

The ignition system shown in FIG. 1 is designed for an internal combustion engine (not shown) in a motor vehicle. The source of energy for the system is a battery 1 which may be the battery of the automobile. The negative side of battery 1 is connected through a line 2 to reference potential, while the positive side is connected through an operating switch 3 (ignition switch) to the positive supply line 4. Supply line 4 is connected to one terminal of the primary winding 5 of an ignition coil 6. The other side of primary winding 5 is connected through an electronic interrupter switch 7 and a monitoring resistor 8 to reference potential. A secondary winding 10 of ignition coil 6 is connected through a spark plug 11 to the same reference potential. The base of transistor 9 is connected to the emitter of an npn transistor 12 and through a resistor 13 to line 2. The base and collector of transistor 12 are connected through resistors 14 and 15, respectively, to the cathode of a diode 16. Diode 16 prevents damage to the system due to inadvertent polarity reversals. Its anode is connected to line 4. The base of transistor 12 is further connected to the collector of an npn transistor 18 whose emitter is connected to line 2. A supply line 17 is connected to the cathode of diode 16. A voltage divider network including a resistor 19, a resistor 20, and a preferably variable resistor 21 is connected between lines 17 and 2. The common point of resistors 21 and 20 is connected through a resistor 22 to the emitter of transistor 9. The common point of resistors 19 and 20 is connected to the base of transistor 18 and is further connected through a resistor 23 to the emitter of an npn transistor 24. The base and collector of transistor 24 are connected through resistors 25, 26 respectively to line 17. The emitter of transistor 24 is connected through a series circuit including resistors 27 and 28 to line 2, the common point of resistors 27, 28 being connected to the base of an npn transistor 29. The emitter of transistor 29 is connected to line 2, while its collector is connected through a resistor 30 to line 17. The collector of transistor 29 is connected through a series circuit including a resistor 31 and a resistor 32 to line 2, the common point of resistors 31 and 32 being connected to the base of an npn transistor 33. The emitter of transistor 33 is connected to the emitter of transistor 9. The collector of transistor 33 is connected through a series circuit comprising a resistor 34 and a resistor 35 to line 17, the common point of resistors 34 and 35 being connected to the base of a pnp transistor 36. The emitter of transistor 36 is connected through a resistor 37 to line 17, so that transistor 36 constitutes a constant current source.

A further circuit connected to line 17 includes a voltage divider including a resistor 38, a resistor 39, and a resistor 40 connected to line 2. The common point of resistors 38 and 39 is connected to the anode of a blocking diode 41. The cathode of diode 41 is connected to the collector of transistor 33 and is further connected to the anode of a blocking diode 42 whose cathode is connected to the collector of transistor 29. The common point of resistors 39 and 40 is connected to the base of an npn transistor 43. The emitter of transistor 43 is connected through a resistor 44 to line 2. This transistor therefore also constitutes a constant current source. The collector of transistor 36 is connected to the collector of transistor 43 and both are connected to one terminal of a capacitor 44 whose other terminal is connected to line 2. Transistors 36 and 44 together with capacitor 45 constitute an integrator circuit. Capacitor 45 functions to shift the threshold value of a threshold circuit 46 which, in FIG. 1, is represented as an operational amplifier 47. The inverting input of operational amplifier 47 is connected through a resistor 48 to the terminal of capacitor 45 which is not connected to line 2, while the direct input is connected through a positive feedback resistor 49 to the output of operational amplifier 47. The output of operational amplifier 47 is further connected to a resistor 50 whose other terminal is connected to line 17 and to the anode of a blocking diode 51 whose cathode is connected to the base of transistor 24. A capacitor 52 is connected in parallel with diode 51. The direct input of operational amplifier 47 is further connected through a resistor 53 to the common point of two resistors 54, 55, the latter constituting a series circuit connected between lines 17 and 2. The inverting input of operational amplifier 47 is connected through a resistor 56 to a circuit point 57 which constitutes the output of a linear amplifier 58.

The input signals for linear amplifier 58 are derived from a Hall generator 59. The current path for Hall generator 59 is connected between lines 17 and 2, while its voltage is generated between the bases of two npn transistors 60, 61. The emitters of transistors 60, 61 are connected through resistors 62, 63, respectively, to the collector of an npn transistor 64, while their collectors are connected through resistors 65, 66, respectively, to line 17. Transistors 60 and 61 together constitute an difference amplifier. The base of transistor 64 is connected to the common point of two resistors 67, 68, which are connected as a series circuit between lines 17 and 2. The emitter of transistor 64 is connected to the emitter of an npn transistor 69, and through a resistor 70 to line 2. The collector of transistor 69 is connected to line 17. Also connected between lines 17 and 2 is a resistive network including resistors 71, 72, 73 and 74. The common point of resistors 73 and 74 is connected to the base of transistor 69. The common point of resistors 72 and 73 is connected to the collector of an npn transistor 75, whose emitter is connected to line 2 through a resistor 76, and through a resistor 77 to the common point of resistors 71 and 72. The common point of resistors 71 and 72 is further connected to the cathode of a diode 78 whose anode is connected to line 2. Diode 78 is a Zener diode. The base of transistor 75 is connected to line 2 through a series circuit including resistors 79 and 80. The common point of resistors 79 and 80 is connected through a resistor 81 to the common point of two resistors 82, 83 and is further connected through a resistor 84 to the common point of two resistors 85, 86. Resistors 82, 83 constitute a series circuit between the emitter of an npn transistor 87 and the collector of an npn transistor 88, while resistors 85, 86 are connected as a series circuit between the emitter of an npn transistor 89 and the collector of an npn transistor 90. The collector of transistor 87 is connected to line 17, while its base is connected to the collector of transistor 60. The collector of transistor 89 is connected to line 17, while its base is connected to the collector of transistor 61. The base of transistor 88 is connected through a resistor 91 to line 2, and through a resistor 92 to the emitter of transistor 87. The base of transistor 90 is connected through a resistor 93 to line 2 and through a resistor 94 to the emitter of transistor 89. The emitter of transistor 87 and the emitter of transistor 89 are connected through resistors 95, 96, respectively, to the collector of an npn transistor 97. Npn transistor 97 is connected as a diode, in parallel with the base-emitter circuit of an npn transistor 98. Thus the bases of transistors 97 and 98 are connected in common and the common connection is connected to the collector of transistor 97, while the emitters of transistors 97 and 98 are connected to line 2. The collector of transistor 98 is connected to the common point of the emitter of transistor 90 and the emitter of transistor 88. The collector of transistor 88 is connected to the base of an npn transistor 99. The collector of transistor 99 is connected to line 17, while its emitter, which constitutes the output 57 of the linear amplifier, is connected through a resistor 100 to line 2.

Figure 2:
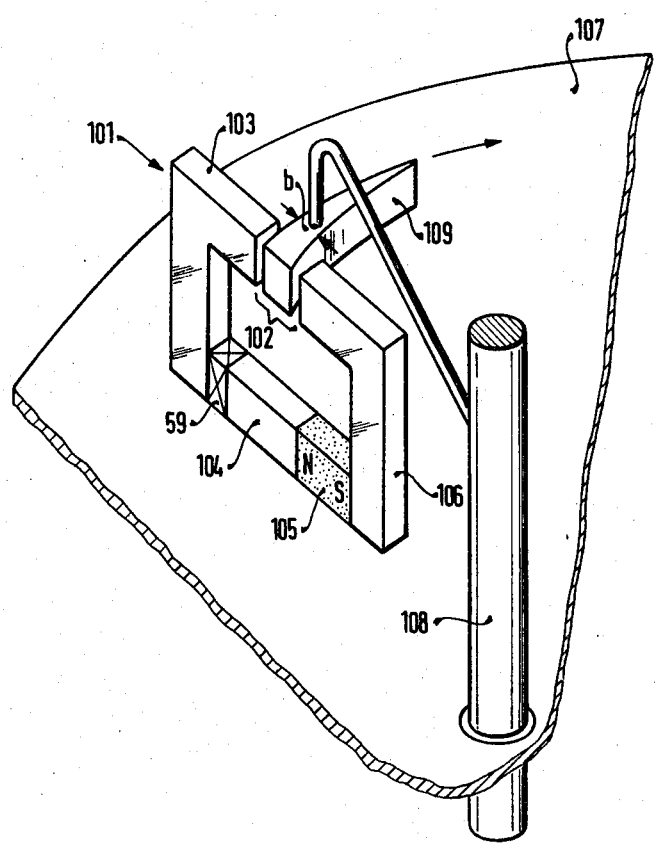
FIG. 2 is a schematic diagram showing the construction of the control signal generator of the present invention.

As shown in FIG. 2, Hall generator 59 is part of a magnetic circuit 101. Magnetic circuit 101 includes an air gap 102, a yoke having a first part 103, Hall generator 59, the second part, 104, of the yoke, a permanent magnet 105, and the last part, 106, of the yoke. Preferably, magnetic circuit 101 is a single unit and the unit is mounted on a movable plate 107 whose position is adjustable by a vacuum governor (not shown). A shaft 108 is coupled to the crankshaft of the engine. During operation, shaft 108 moves a member 109 which is made of magnetically conductive material through air gap 102 so that the magnetic flux slowly changes while the crankshaft turns through a predetermined angle of rotation. In the embodiment shown in FIG. 2, this is accomplished by tapering member 109 in the direction of rotation, that is causing its cross section to increase as it moves through the air gap due to an increase in width b.

OPERATION

Figure 3:
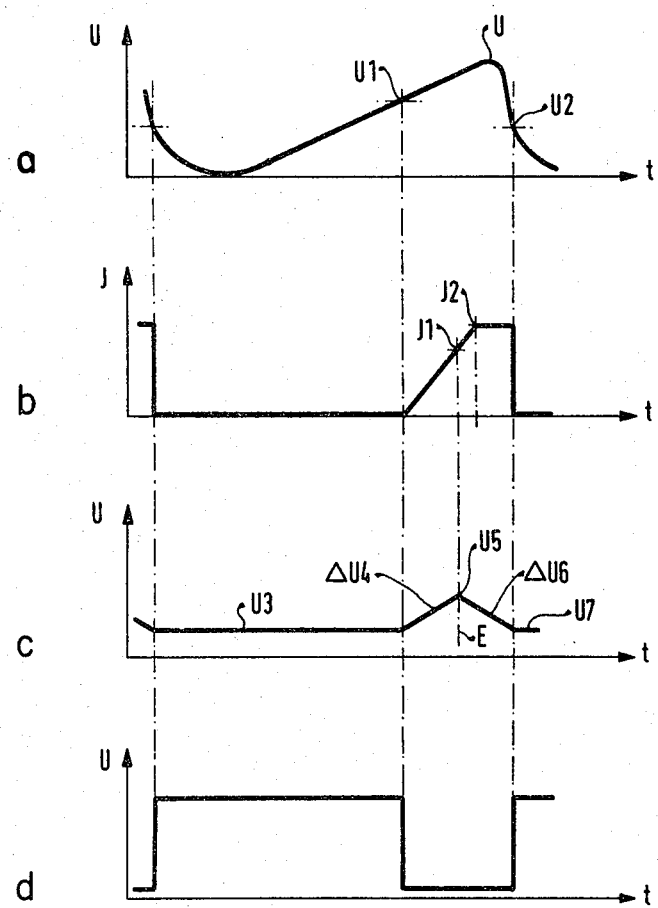
FIG. 3 is a signal vs. time diagram for various points of the circuit of FIG. 1.

The equipment is ready for operation as soon as switch 3 is closed. Let it be assumed that member 109 enters the air gap, thereby causing the flux operating on Hall generator 59 to increase slowly. This causes the voltage across the output circuit of Hall generator 59 to increase correspondingly. The rise in voltage causes the conductivity of the emitter-collector circuit of transistor 61 to increase and that of transistor 60 to decrease. This, in turn, causes the conductivity of the emitter-collector circuit of transistor 67 and that of transistor 99 to increase to the extent to which the voltage at the output of Hall generator 59 increases. Therefore, the rise in voltage at the output of Hall generator 59 is reproduced after linear amplification at output 57. The variation of voltage with respect to time at output 57 is shown in FIG. 3a. If this voltage reaches the value $U_1$, that is threshold value of threshold circuit 46, the output of operational amplifier 47 switches to approximately reference potential (ground potential). This, in turn, causes the emitter-collector circuit of transistors 24 and 28 to be switched to the blocked state and that of transistors 12 and 7 to be switched to the conductive state. A current flows through primary winding 5 and monitoring resistor 8. The transition of the emitter-collector circuit of transistor 24 into the blocked state causes a similar switching to the blocked state of the emitter-collector circuit of transistor 29. Control current can now flow through the base-emitter circuit of transistor 33, causing the emitter-collector circuit of transistor 33 and the emitter-collector circuit of transistor 36 to become conductive. Capacitor 45 begins to charge. Initially, the charge across capacitor 45 has a value creating a voltage $U_3$ across the capacitor, as shown in the voltage vs. time diagram in FIG. 3c. The charging of capacitor 45 results in a change $\Delta U_4$ at the capacitor terminal not connected to reference potential.

At this time it is assumed that the current through primary winding 5 of ignition coil 6 reaches the value $I_1$, that is the value at which the voltage across monitoring resistor 8 has increased sufficiently to cause the emitter-collector circuit of transistor 33 to become blocked. This, in turn, causes the emitter-collector circuit of transistor 36 to be blocked, ending the charging of capacitor 45. At this point, the terminal of capacitor 45 not connected to reference potential is at a voltage $U_5$. When the emitter-collector circuit of transistor 33 blocks, control current can flow through the base-emitter circuit of transistor 43, causing its emitter-collector circuit to become conductive and a discharge of capacitor 45 to be initiated. A voltage across capacitor 45 thereafter changes by a change $\Delta U_6$. The change $\Delta U_6$ is terminated at the ignition time. At the ignition time, the voltage across capacitor 46 is a voltage $U_7$.

Transistor 18 limits the current in primary winding 5 to a predetermined value $I_2$ which exceeds the monitored value $I_1$. The value $I_2$ is so chosen that, when it is reached, sufficient ignition energy is stored in the ignition coil. When the value $I_2$ is reached, the voltage drop across monitoring resistor 8, as transferred through resistors 22, 20 to the base of transistor 18, causes a slight conductivity of the emitter-collector circuit of transistor 18. This in turn limits the control current for transistors 12 and 7, causing the current conducted through the emitter-collector circuit of transistor 9 to be limited to the value $I_2$.

When member 19 (FIG. 2) leaves air gap 102, the voltage at the output of linear amplifier 57 (FIG. 1), after reaching a peak value U, returns to its initial value since the voltage at the output of Hall generator 59 is no longer present. When, during the decrease of voltage, the cut-out threshold of threshold circuit 46 is reached, its output assumes a positive potential which is approximately equal to the potential at the positive side of battery 1 (FIG. 3d). This causes the emitter-collector circuits of transistors 24 and 18 to become conductive and those of transistors 12 and 9 to become blocked, interrupting the current through primary winding 5 and inducing a high voltage pulse in secondary winding 10 of ignition coil 6. The high voltage pulse causes an electrical discharge across spark plug 11 (i.e. a spark is generated). When the emitter-collector circuit of transistor 24 is conductive, the emitter-collector circuit of transistor 29 is also conductive, so that the emitter-collector circuits of transistors 33, 43 and 36 remain reliably blocked until a renewed initiation of current in the primary winding 5.

The charging and discharging of capacitor 45 is so designed that, when the speed of the engine remains constant, voltage changes $\Delta U_4$ and $\Delta U_6$ are symmetrical to each other with respect to a perpendicular E (FIG. 3c) drawn through the value $U_5$. The change from charging to discharging of capacitor 45 is, of course, fixed by the monitored current value $I_1$. For increasing engine speeds, the integration value across capacitor 45 increases in a positive direction, since the change $\Delta U_6$ is terminated early relative to the change $\Delta U_4$. The integration value across capacitor 45, that is the residual voltage across capacitor 45 at the ignition time, is utilized to shift the threshold of operational amplifier 47 in such a way that thresholds $U_1$ and $U_2$ are shifted in the direction of peak value U when the current flowing through primary winding 5 is flowing for an excessively long time, that is, for example, as the speed of the engine decreases. When the current flow through primary winding 5 is present for too short a time, that is for example when the speed of the engine is increasing, the residual voltage across capacitor 45 causes the threshold values to be shifted in a direction away from peak value U.

The value $I_2$ of current through the primary winding at the ignition time should be so chosen that, as the engine is starting up, this value of current will flow for a predetermined time period prior to the ignition time. Then, when the engine accelerates, and the time that current flows in primary winding 5 is correspondingly decreased, sufficient energy for ignition will still be stored in the ignition coil.

In case switch 3 is closed and the emitter-collector circuit of transistor 9 happens to be in the conductive state but the engine is not running, the emitter-collector circuit of transistor 9 is automatically switched to the blocked state as follows. Capacitor 52 is charged through elements 3, 16, 25, 49, 53 and 54, finally causing the emitter-collector circuit of transistor 24 to become conductive. This causes the emitter-collector circuit of transistor 18 to become conductive and that of transistors 12 and 9 to become blocked.

Linear amplifier 58 which, preferably, is constituted by a difference amplifier, has a stabilized operating point. If, for example, the supply voltage decreases, the bias voltage at the bases of transistors 87 and 89 also sinks to a lower value. This causes a decrease of conductivity in the emitter-collector circuits of transistors 87 and 89 and therefore a decrease of base current for transistors 88 and 90. The decrease in base current causes a decreased conductivity of the emitter-collector circuits of transistors 88 and 90. A fraction of the voltage at the common point of resistors 82 and 83 is applied through resistors 81, 84 and resistor 79 to the base of transistor 75. The bias voltage for transistor 75 decreases with decreasing supply voltage. The voltage at the emitter of transistor 75 is stabilized by Zener diode 78. The difference in potential between the emitter and base of transistor 75 therefore decreases with decreasing supply voltage, causing the potential at the collector of transistor 75 to increase. This increase in potential causes the emitter-collector circuit of transistor 69 to become more conductive. This causes a corresponding decrease in the conductivity of the emitter-collector circuit of transistor 64 and therefore at the emitter-collector circuits of transistors 60 and 61. The current flowing through resistors 65, 66 decreases, thereby causing the voltage drop across these resistors to decrease. This change opposes the change in bias voltage at the bases of transistors 87 and 89. Transistor 98 in conjunction with transistor 97 constitutes a constant current source.

Various changes and modifications may be made within the scope of the inventive concepts.

We claim:

1. In an ignition system of an internal combustion engine having a shaft, said ignition system having spark creating means (6, 11) requiring a predetermined value of ignition current flowing therethrough for creating a spark, electronic interrupter switch means (9) connected to said spark creating means for, respectively, allowing and blocking ignition current flow therethrough in response to a first and second switch control signal applied thereto, threshold circuit means (47) having a cut-in threshold and a cut-out threshold for furnishing a first and second threshold output signal when a threshold input signal applied thereto becomes, respectively, greater than said cut-in threshold and less than said cut-out threshold and means (33, 29, 24, 18) for applying said first and second switch control signal to said electronic switch means in response to said first and second threshold output signal, respectively:

improved means for generating said threshold input signal comprising

Hall generator means (59) for furnishing a Hall generator output signal varying as a function of magnetic flux applied thereto;

magnetic circuit means (103–106) coupled to said Hall generator means for applying said magnetic flux thereto;

means (108, 109) for slowly changing the flux through said magnetic circuit means and thereby through said Hall generator means while said shaft of said engine rotates through a predetermined angle of rotation, thereby creating a time-varying Hall generator output signal; and a linear amplifier (58) interconnected between said Hall generator means and said threshold circuit means for furnishing a threshold input signal corresponding to said Hall generator output signal to said threshold circuit means.

2. An ignition system as set forth in claim 1, wherein said magnetic circuit means has an air gap (102); and wherein said means for slowly changing said magnetic flux comprises means for slowly changing the reluctance of said air gap while said shaft of said engine rotates through said predetermined angle.

3. An ignition system as set forth in claim 1, wherein said linear amplifier is a difference amplifier having an operating point stabilized with respect to supply voltage variations.

4. In an ignition system of an internal combustion engine having a shaft, said ignition system having spark creating means (6, 11) requiring a predetermined value of ignition current flowing therethrough for creating a spark, electronic interrupter switch means (9) connected to said spark creating means for respectively allowing and blocking ignition current flow therethrough in response to a first and second switch control signal applied thereto threshold circuit means (47) having a cut-in threshold and a cut-out threshold for furnishing a first and second threshold output signal when a threshold input signal applied thereto becomes, respectively greater than said cut-in threshold and less than said cut-out threshold and means (33, 29, 24, 18) for applying said first and second switch control signal to said electronic switch means in response to said first and second threshold output signal, respectively:

improved means for generating said threshold input signal comprising

Hall generator means (59) for furnishing a Hall generator output signal varying as a function of magnetic flux applied thereto;

magnetic circuit means (103–106) coupled to said Hall generator means for applying said magnetic flux thereto, said magnetic circuit means having an air gap;

means (108, 109) for slowly changing the reluctance of said air gap thereby changing the flux through said magnetic circuit means and through said Hall generator means while said shaft of said engine rotates through a predetermined angle of rotation, thereby creating a time-varying Hall generator output signal, said means for slowly changing the reluctance, comprising an auxiliary shaft (108) coupled to said shaft of said engine for rotation therewith, and a magnetically conductive member (109) mechanically coupled to said auxiliary shaft so that said magnetically conductive member passes through said air gap while said shaft of said engine rotates through said predetermined angle, said magnetically conductive member having a cross-section varying in the direction of movement through said air gap; and means (58) interconnected between said Hall generator means and said threshold circuit means for furnishing a threshold input signal corresponding to said Hall generator output signal to said threshold circuit means.

* * * * *